R. W. LINVILLE.
PNEUMATIC VEHICLE TIRE.
APPLICATION FILED JULY 6, 1916.
1,264,100.
Patented Apr. 23, 1918.
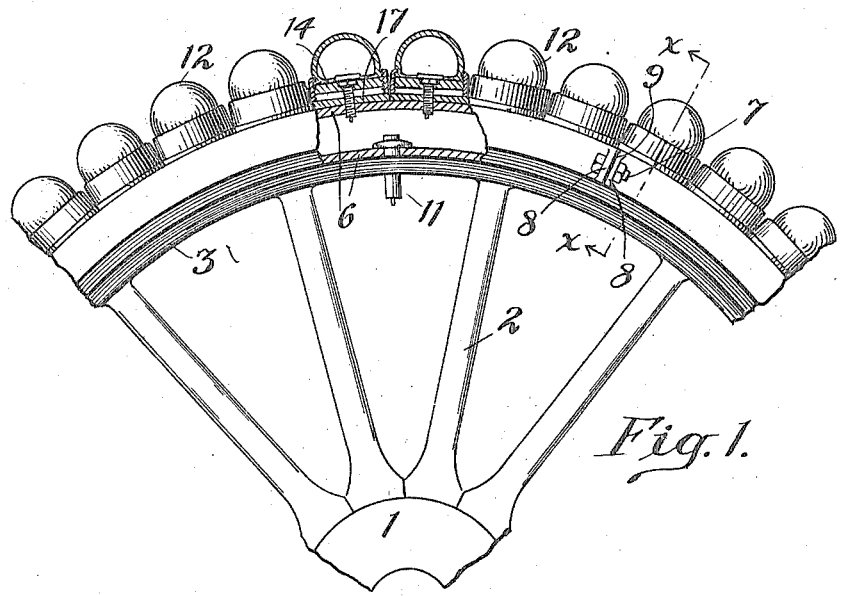
Fig. 1.
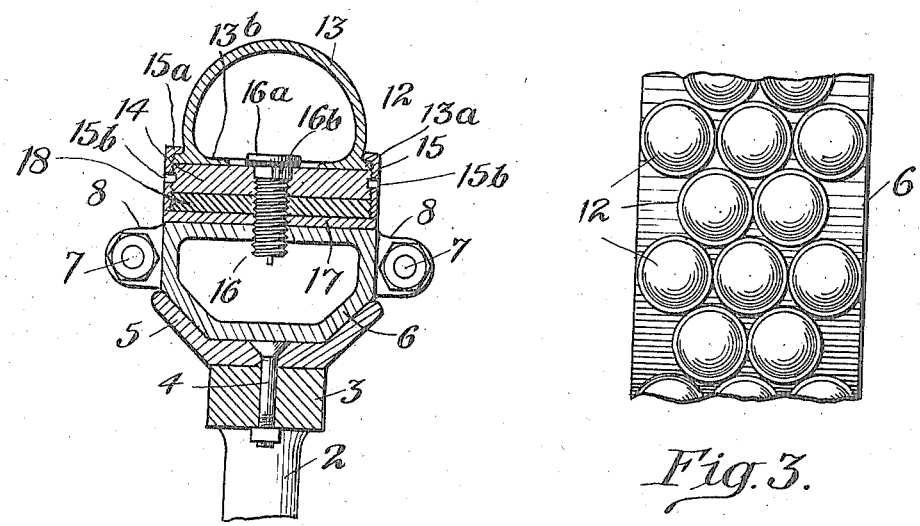
Fig. 2.
Fig. 3.
Inventor
Robert White Linville
By Edward E. Clement
Attorney

UNITED STATES PATENT OFFICE.

ROBERT WHITE LINVILLE, OF OCEANPARK, CALIFORNIA.

PNEUMATIC VEHICLE-TIRE.

1,264,100.  Specification of Letters Patent.  Patented Apr. 23, 1918.

Application filed July 6, 1916. Serial No. 107,847.

*To all whom it may concern:*

Be it known that I, ROBERT WHITE LINVILLE, a citizen of the United States of America, residing at Oceanpark, in the county of Los Angeles and State of California, have invented certain new and useful Improvements in Pneumatic Vehicle-Tires, of which the following is a specification, reference being had therein to the accompanying drawing.

My invention relates to pneumatic vehicle tires and has for its object the production of a subdivided tire of which the component units shall be readily detachable, and separately sealed, but inflated from a common source or air chamber.

In seeking to attain my object, I have found that a uniform and continuous tread surface is not essential, for two reasons, (1) that in rolling the actual point of support on the tread, that is to say the point in contact with the ground, is shifted so rapidly that a truly elastic tread, such as is furnished by the usual pneumatic rubber tire, may have its surface broken up with slight intervals between successive supporting surfaces, without causing injuries or indeed noticeable vibration; and (2) that the weight exerted on a tire tends to distort and somewhat flatten the supporting or contact portion of the tread, so that if divided elastic units are made reasonably closely together, they will tend to expand laterally as they are compressed vertically, thereby filling the normal interstices or intervals between them.

In order to attain my object, and with the foregoing finding in mind, I provide a continuous air chamber fitted to a rim of a wheel, and adapted to be filled with compressed air through a suitable valve, and I arrange around this rim a series of hemispherical elastic containers which for convenience I shall designate herein as "balls," each of which is independently inflated or filled with air under pressure, through a valve stem which at the same time serves to attach the ball to the rim by screwing into the rim chamber through an air-tight orifice.

In case of injury such as puncture to one of these balls, it may be instantly detached and as quickly replaced with a new one, or if it remain in place, the rest of the tread surface, made up of undamaged elastic balls, will be sufficient to carry the vehicle until a convenient time and place are found for repairing the damage.

As additional objects of my invention, I may mention cheapness, simplicity, and ease of manufacture. These are all attained by the reduction of the tire to a practically indestructible and very simple rim chamber, and a tread surface made up of a large number of standard independent but coöperating units. Many expenses incident to the manufacture of large, continuous and homogeneous rubber tires and tubes are avoided by this construction and the additional cost of individual valves and stems is more than compensated by the saving in material and labor in the manufacture and maintenance of the undivided unit type of tire heretofore in common use.

My invention is illustrated in the accompanying drawings in which

Figure 1 is a side view partly in section of a portion of a wheel fitted with a tire embodying the invention.

Fig. 2 is a cross section on the line $x$—$x$ of Fig. 1.

Fig. 3 is a face view of a portion of a broad faced tread employing several units side by side, each unit of the same character as the tread unit shown in Figs. 1 and 2.

Referring to the drawings and particularly to Figs. 1 and 2, 1 represents the hub of a wheel, 2 the spokes, and three the felly, all supposed to be of wood and of ordinary construction. As the character of the wheel itself, however, forms no part of the present invention, this wooden construction may be replaced by any other desired, such as wire spokes and a metal hub, or sheet metal disks and a metal hub, or the like.

Fitted around the felly, and secured thereto in any suitable manner, as for example by bolts 4 (see Fig. 2), is a metal rim 5 with inner and outer flanges to receive and hold the tire tube 6. This tire tube is made of metal and is preferably formed in sections joined together by means of clamping bolts 7 passing through ears 8 on the ends of adjacent sections. The number of sections is a matter of convenience, and in view of the necessity for making this tube asbsolutely air tight, it may be made in one length carried completely around the wheel with its ends bolted together with interposed packing 9 as shown in Fig. 1. With this construction there would only be one break in the tube and consequently only one joint to pack, with reduced possibility of leakage. As a detail of construction and with particular reference to the packing 9, this may be either a gasket or a flat ring, and in the latter case the two ends of the tube would telescope into each other, the inner one being tapered and the outer one being somewhat coned to receive the taper, the packing ring or gasket then being interposed between the tapered end and the seat. As shown in Fig. 2, I have shown the tube 6 flattened in cross section, but this matter of cross section is also one for selection, and in many cases the section may well be circular, such a shape particularly adapting the tube to withstand pressure and shocks due to driving over rough roads. The thickness of the tube walls is not a matter of fixed and determinate measurement, for two reasons, first because the walls in practice are supported by air pressure within the tube, and second because the tensile strength of the metal itself, proportionately to the strains it must resist, will vary with the size of the wheel, and other factors which belong in the domain of design and not of invention. It may be stated, however, that a tube designed for a wheel of average size, such as ordinarily take a rubber tire 33"x3", can be of comparatively light metal, but in such case the metal must have a high tensile coefficient, and need not be especially stiff, as the air pressure will tend to maintain its normal configuration. For larger wheels, or for heavy vehicles, the thickness of the metal may be proportionately increased, and its walls may be expected to offer a greater direct resistance to shocks than thinner and more flexible walls.

This metal tube, which performs the function of an air trunk for the flexible inflated tread units, is fitted with one or more common valve stems 11, which according to usual practice may pass through the felly and be capped inside the same.

Fitted around the outside of the tube 6, and individually deriving air pressure therefrom, is a series of tread units 12, all of which are exactly alike and one of which is shown in section in Fig. 2. The component parts of each unit are an inverted rubber cup 13, a base disk 14, a clamping ring 15, an individual valve stem and valve 16, and a compensating seat 17. The disk 14 may be of brass or similar metal, or of other materials. The rubber cup 13 is flanged at $13^a$ and is seated upon the disk 14 to which its flange is closely held by an overlying flange $15^a$ of the clamping ring 15. The joint between the flange $13^a$ and the upper face of the disk must be air tight and adapted to resist considerable pressure. Moreover, it must hold the air under variable thrust upon and consequent distortion of the cup 13. I therefore purpose interposing a layer of cement, with or without an annular gasket or packing above and below the flange $13^a$, and in order to still further seal the joint, I preferably mold the cup so that it may have an inner lip or annular flap indicated at $13^b$ in Fig. 2, which will be forced down against the upper surface of the disk 14 by the pressure within the cup 13, the pressure on the flap and the consequent pressure of the flap against the disk being of course increased by any heavy pressure or sudden shock upon the outer surface of the cup 13.

The valve stem 16, of brass or other suitable material, carries a head flange $16^a$ on the upper face of the disk 14, and is shaped at $16^b$ to fit a polygonal opening in the disk, so that the parts will turn together in screwing the unit onto the rim. A gasket or packing ring is preferably inserted beneath the head flange $16^a$ to make a tight joint. The valve stem is threaded through the greater portion of its length down to the lower end, and the threads take into a threaded opening in the outer wall of the tube 6.

The seat 17 is a disk (or it may be a continuous strip around the entire rim) which has its under surface curved to accommodate itself to the curved periphery of the rim tube, and its upper surface plane to receive and evenly support the plane annular surface of the clamping ring 15. In order that the entire weight may not come on the edges of this ring, I may insert an additional gasket 18 of suitable material, preferably more or less flexible, in the space within the lower edges of the ring, and between the disk 14 and the seat 17. This gasket 18 may be of resilient material such as rubber, or it may be fiber or simply a dense packing material forced into the cavity and compressed when the unit is screwed down into position on the seat.

In order to conveniently screw and unscrew the units 12 to and from the rim, I provide means for engaging a tool which are indicated at $15^b$ as small openings formed in the clamping ring 15, beneath which a roughened annular surface is formed all around the edge of the disk 14, so that a spanner may be used with points taken through the opening $15^b$ into the roughened surface no matter what the position of the clamping ring 15 on the disk 14. As an alternative for this arrangement, the clamping ring 15 may be made polygonal on its outer surface or otherwise formed to take a wrench or spanner and may be locked to the disk 14 in any suitable manner, as by means of set screws, after being screwed down to compress the flange $13^a$ on the cup or bulb 13.

The seat 17 if of resilient material, and especially if individual to a unit, need not be especially shaped, but will shape itself when the unit is applied to the rim. For this purpose there may be employed a built up gasket or disk formed of alternate layers of canvas and rubber, with or without face disks of hard fiber or metal to take the wear.

If it be desired to do away with the compensating seat, flat seats can be formed upon the outer surface of the rim, each seat being concentric with the threaded valve opening into which the screw 16 of the unit is screwed. The formation of such individual seats on the tubular rim, however, is expensive, and in most cases would have to be avoided.

It is thought that the method of assembling and operation of my invention will be comparatively clear from the foregoing description, and will be fully understood from the following brief statement: The ring 5 being secured in place on the felly, the tube 6, whether in one section with abutting ends or in several sections, is placed upon the ring 5, with the valve stem 11 in the opening through the felly, the packing 9 is inserted, and the couplings 7—8 are then set up tightly. With the telescoping joint heretofore described, the tube may be drawn very firmly into contact with the channel rim 5, and the wheel is then ready for attachment of the tread units. Each unit is complete as shown in Fig. 2, and is applied by fitting the compensating seat to the rim tube, then inserting the valve stem 16 through the central opening into the threaded opening in the rim tube, and screwing it down until the unit is seated firmly and immovably. The parts then appear fully assembled as shown in Fig. 2, and when all the units are in position, the wheel will appear as in Fig. 1.

The operation of this wheel involves successive compressions of the units 12 as the wheel rolls. The dimensions and material of the cups or bulbs 13 may be such that they will resist relatively high pressures, because each unit constituting an entirely separate portion of the tread, there is no possibility of distributing the air compression, and obtaining the advantage of balancing expansion through a continuous body of elastic medium as in the ordinary tire. However, as against this there is the enormous advantage of great subdivision of the most vulnerable part of a tire, that is the pressure containing body. With my tire, if one of the units becomes punctured or ruptured in any way, it may be removed with a suitable tool and a fresh unit inserted in place with small expenditure of time and trouble.

In connection with the question of inflation, it is necessary to point out the operation of the valves in this tire. These are of the ordinary type well known in the art and commonly employed with inner tubes in the present commercial type of rubber tires. The essentials of such a valve are the stem, the valve seat formed within the stem, and a small spring pressed plunger carrying a threaded ring with shoulders formed on it by which the stem can be screwed into the tube until the valve seats. In inflating a tire through such a valve, the little plunger is pushed in so as to lift the valve from its seat, but as soon as the mechanical pressure is removed, the air pressure in the tube forces the valve against its seat and holds it there. The valves in my case are of this type, and open inwardly but close outwardly with respect to each unit and also with respect to the air tube or trunk 6. Thus, in inflating the tire, the pump tube is attached to the inner end of the stem 11, and air is forced therethrough into the tubular rim or trunk 6. As the pressure rises in the tube 6, it opens the valves in all the individual units and inflates the latter. When the desired pressure is reached, the pump is detached and the valve in the stem 11 seats itself and retains the pressure in the whole tire system of units and trunk, just the same as in the ordinary tire and tube. In case of a puncture or rupture of one of the bulbs 13, air would escape from the tube 6 through the valve 16, and through the ruptured bulb 13, but the valves of all the other bulbs would automatically seat themselves, if not already seated, and thus retain the pressure in all of the interrupted units. After such an episode, if the tube 6 has thin walls, as heretofore mentioned, it would of course be necessary to inflate it in order to prevent collapse of the tube in running, but if the walls of the tube 6 be thick enough to carry the weight of the vehicle, one or more ruptured units may be disregarded, and the run continued to some convenient stop for making repairs.

In Fig. 3 I have shown a broad faced tread wide enough to take several units across. The general construction of the wheel and the trunk 6 in this case would be the same as shown in Fig. 2, but the trunk tube 6 would have to be much wider, and instead of having the threaded openings to receive the valve stems 16 centered all around the tread, they are arranged on several parallel circles as indicated. The arrangement of the units on such a broad tread is capable of much diversification, and as the specific arrangement forms no essential part of the present invention, I consider all arrangements within the scope of my appended claim. The units may be set in staggered rows or in oblique transverse rows, or on wavy lines, or in diamond or square figures, or otherwise as may be found most desirable.

In addition to possible variations in arrangement of the tread units, many other non-essential changes and modifications may be made in this structure, without departing from the scope and purview of my invention. I wish it distinctly understood that all such changes and modifications are contemplated by me as within the scope of the appended claim.

It will be noted that throughout this description and in the following claim I make use of the word "air" to designate the fluid medium under pressure used in the rim tube and bulbs. It is to be understood that this word includes any gas or other elastic fluid medium which may be substituted for air.

Having thus described my invention what I claim and desire to secure by Letters Patent is:

A combined rim and tire for vehicles comprising a tubular rim fitted to the felly and serving as an air trunk, a valve for said air trunk and a plurality of individual pneumatic resilient units each comprising the following instrumentalities; an elastic bulb having a flanged circular base, a rigid disk shaped seat, an annular flanged clamping ring arranged to clamp said bulb on said seat with the flange of the bulb base between the clamping ring flange and the said seat, a compensating seat for said clamping ring of substantially the same diameter and having its bottom surface arranged to fit the curvature of the rim and its top surface to fit the lower edge of the clamping ring, a flexible gasket arranged to fit within the clamping ring between said seats, and a valve tube communicating with the interior of said bulb carried by said disk shaped seat and projecting therethrough and through said gasket and said compensating seat, said valve tube being threaded into the rim for the purpose of holding the resilient unit thereon.

In testimony whereof I affix my signature in presence of two witnesses.

ROBERT WHITE LINVILLE.

Witnesses:
  MAUD TROXEL,
  WM. J. HANLON.

Copies of this patent may be obtained for five cents each, by addressing the "Commissioner of Patents, Washington, D. C."